United States Patent [19]
Nicholls

[11] 3,791,407
[45] Feb. 12, 1974

[54] FLUID FLOW CONTROL VALVES

[75] Inventor: Lawrence George Nicholls, Tyseley, England

[73] Assignee: Girling Limited, Birmingham, England

[22] Filed: Sept. 8, 1971

[21] Appl. No.: 178,767

[30] Foreign Application Priority Data
Sept. 8, 1970 Great Britain............ 42921/70

[52] U.S. Cl....... 137/512.15, 137/493.8, 137/513.3, 188/317
[51] Int. Cl............................................. F16k 17/26
[58] Field of Search 137/493, 493.8, 493.9, 512.15, 137/512.4, 516.11, 516.15, 516.17, 516.19, 516.21, 516.23, 513.3, 513.7, 525.3; 188/282, 317

[56] References Cited
UNITED STATES PATENTS
| | | | |
|---|---|---|---|
| 3,199,636 | 8/1965 | De Carbon | 188/317 |
| 3,312,312 | 4/1967 | De Carbon | 188/317 |
| 3,363,729 | 1/1968 | Rumsey | 137/493.9 X |
| 3,430,648 | 3/1969 | Botkin | 137/493 |
| 3,516,520 | 6/1970 | Agren et al. | 188/282 |
| 3,547,561 | 12/1970 | Lavon | 137/512.4 X |
| 3,605,801 | 9/1971 | De Carbon | 188/317 X |

FOREIGN PATENTS OR APPLICATIONS
1,000,398  8/1965   Great Britain................. 137/493

Primary Examiner—William R. Cline
Attorney, Agent, or Firm—Scrivener, Parker, Scrivener and Clarke

[57] ABSTRACT

A control valve for use in a shock absorber or the like and including a flexible annular valve element engaging inner and outer valve seats; a unitary valve guide and stop is provided having ducts therethrough, the guide being capable of being moulded of inexpensive plastic material thereby eliminating expensive machining, the inner valve seat being an annular member engaging one end of the guide but being entirely separate therefrom.

4 Claims, 7 Drawing Figures

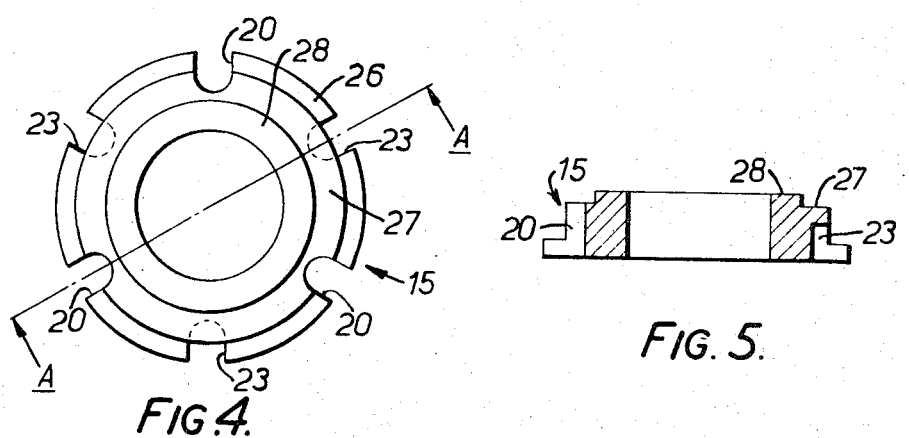
FIG. 4.
FIG. 5.
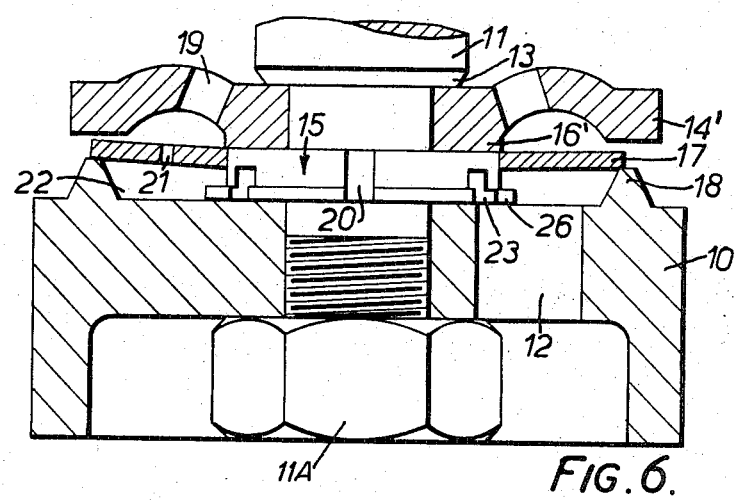
FIG. 6.
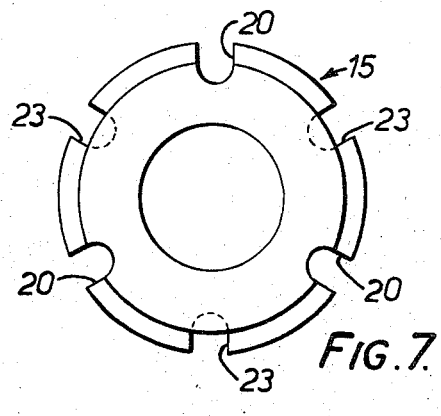
FIG. 7.

FLUID FLOW CONTROL VALVES

The invention relates to fluid flow control valves of the form comprising an annular flexible valve member engageable with valve seats adjacent both its outer and inner peripheries so as to be displaceable from one or other of the valve seats by a pressure difference acting across the valve in either direction to provide a flow passage therethrough.

We have previously proposed, in such valves, the provision of a guide member extending through the valve member from the inner valve seat and serving to locate the valve member laterally, and duct means in the guide means for the flow of liquid past the valve member when the inner edge thereof is lifted from its seat.

According to the present invention, the inner valve seat and guide means are formed as separate components, which are securely clamped together in the assembled valve. This enables the guide member to be made cheaply from any suitable material, such as plastics, ceramics or a suitable alloy, which does not react with the hydraulic fluid, and enables a sharp corner to be obtained between the guide member and the valve seat without any machining. Furthermore, the guide means is formed integrally with a stop for the inner edge of the valve member, to limit is opening movement. Thus operating deflections of the valve member are limited by the valve seat and the stop means respectively.

Three forms of control valve according to the invention will now be described, by way of example, with reference to the accompanying drawings in which:

FIG. 4 is a plan view of the guide member embodied in the valve of FIG. 3.

FIG. 5 is a section on the line AA of FIG. 4.

FIG. 6 shows a part sectional elevational of a further form of hydraulic damper control valve.

FIG. 7 is a plan view of the guide member embodied in the valve of FIG. 6.

Figure 1:
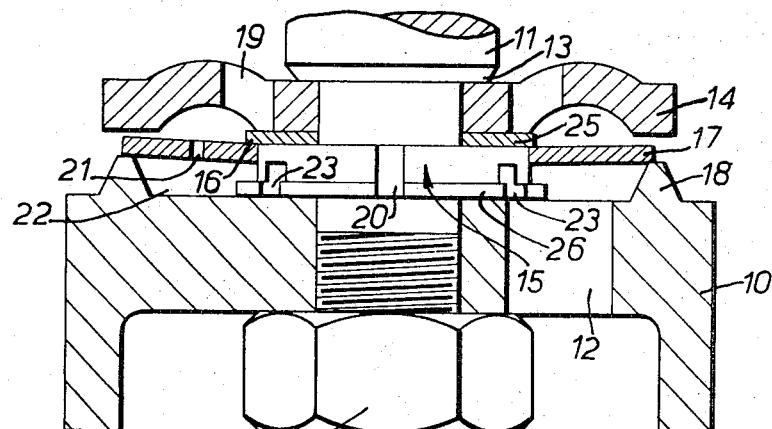
FIG. 1 shows a part sectional elevation of a hydraulic damper control valve.
Figure 2:
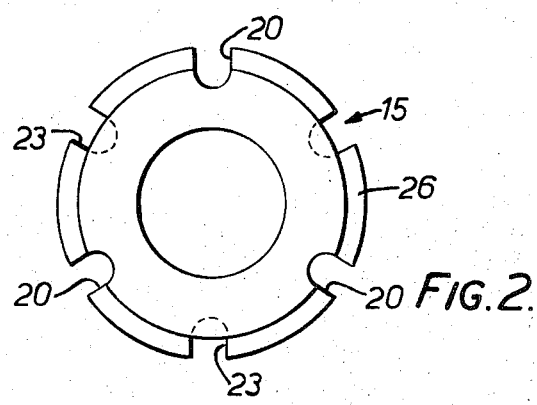
FIG. 2 is a plan view of the guide member embodied in the valve of FIG. 1.

Each of the illustrated embodiments comprises an hydraulic damper control valve for a damper piston 10 having several large apertures 12 and secured to a piston rod 11 by a nut 11A. The control valve assembly comprises an annular central guide member 15, an annular flexible valve member 17, an annular limit stop member 14, an outer valve seat 18 (formed integrally with the piston 10) and an inner valve seat 16 formed either by a separate annular plate 25 (FIGS. 1 and 3) or by a shoulder on the limit stop member 14 (FIG. 6).

The limit stop member 14 is provided with several large through holes 19, and at its outer periphery it overlies, but is spaced from the outer edge of valve member 17 to limit displacement of the outer edge of the valve member off its seat 18. The valve member is flexible and resilient and in its assembled condition is pre-stressed so as to bear firmly against its inner and outer valve seats 16 and 18 respectively, thereby preventing substantial flow of fluid in either direction through the piston. A small orifice 21 does, however, permitting a restricted flow at all times.

The central guide member serves to locate the valve member laterally, i.e., to keep it concentric with the rest of the assembly, and is formed in its external periphery with axial recesses or ducts 20 and 23 for the flow of fluid past the inner edge of the valve member 17 when the inner edge is lifted from its seat 16. The ducts 20 extend from the inner valve seat 16 to the lower face of the guide member, but the ducts 23 extend only over the lower part of the guide member. These ducts, which are optional, serve to increase the through flow area of the duct in the fully open position of the valve member 17 and assist in ensuring adequate dispersion of the fluid, thereby avoiding or minimizing the formation of localised hot spots. The lower end of the guide member is formed with an outwardly directed annular flange 26 which acts as a stop for the inner edge of the valve member 17.

The nut 11A serves to secure the co-axial assembly of parts 10, 15, 25 and 14 to the piston rod 11.

In operation, the inner edge of the valve member is displaced from the valve seat 16 when a sufficient pressure differential is established (by movement of the piston) from the upper to the lower surface of the valve member. Fluid can then flow past the inner edge of the valve member into the ducts 20 and from these through the piston holes 12. On reverse movement of the piston, a pressure differential acts in the reverse direction, causing the valve member to bear more firmly against the inner seat 16 and to flex away from the outer seat 18, and fluid flows outwardly through the annular gap thus created.

Turning now to the characterizing features of the respective embodiments, in FIG. 1 the inner periphery valve seat 16 is formed by an annular plate or washer 25 mounted on the piston rod 11 between the stop member 14 and the guide member 15. The washer 25 is subjected to the preload in the flexible valve member 17, and is preferably made of steel suitably hardened so as to maintain the valve member 17 in its correct position relative to the guide member 15.

Figure 3:
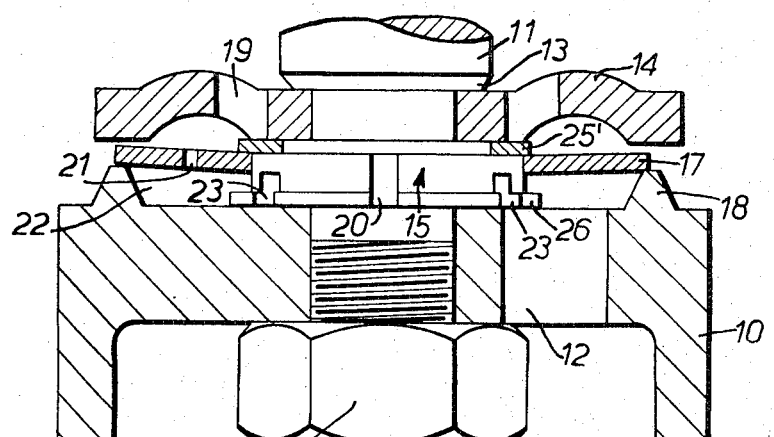
FIG. 3 shows a part sectional elevation of another form of hydraulic damper control valve.

In the valve shown in FIG. 3 the guide member 15 is provided with a shoulder 27 at its upper end and the washer 25' fits around a concentric projection 28 of the guide member 15 and is held between the limit stop 14 and the shoulder 27.

In the valve shown in FIG. 6, the limit stop member 14' is shaped and arranged so as to provide the inner periphery valve seat 16' as a shoulder in an annular inner position of the stop member 14'.

In each of the above described embodiments the guide member 15 is not subject to strict tolerances and can be made cheaply from plastics, ceramics or a cheap alloy. Furthermore, a sharp edged internal corner is obtained at the junction of the lower surface of the valve seat 16 and the periphery of the guide member without the need for machining. The valves can be manufactured and assembled at very modest cost, and yet provide a high degree of accuracy of determination of their operating characteristics. By forming the stop flange 26 integrally with the guide means, accurate registration of the recesses 23 and 20 is automatically assured.

I claim:

1. A control valve for controlling the flow of liquid through aperture means in a piston and including an axial rod for moving said piston through said liquid, an annular outer valve seat on one side of said piston outwardly of the aperture means therein, a valve guide comprising a cylindrical member surrounding said rod and having an integral flange at one end engaging said one side of said piston, an annular member separate from said valve guide and seated on the opposite end thereof, said annular member having a peripheral edge part extending radially outwardly of said valve guide to define an inner valve seat, a flexible annular valve element having its outer periphery on one face normally sealingly engaging said outer valve seat and an inner periphery laterally located on said valve guide with its opposite face normally sealingly engaging said inner valve seat, said inner and outer peripheries being lifted off their respective seats by pressure difference acting across said flexible element according to the direction in which the pressure difference acts, the integral flange of said valve guide limiting movement of the inner periphery of said valve element away from said inner valve seat, axial duct means extending through said guide means including its integral flange for the flow of liquid past the inner periphery of said valve member when the latter is lifted from its seat, an annular stop member carried by said rod and having an outer periphery which overlies the outer periphery of said valve element and limits displacement of its outer periphery away from said outer valve seat, and means clamping said piston, valve guide, inner valve seat and annular stop member on said rod.

2. A valve in accordance with claim 1, herein said inner valve seat is constituted by the outer periphery of an annular plate clamped against the guide means at one end thereof.

3. A valve in accordance with claim 1, wherein the said inner valve seat is constituted by the outer periphery of an annular plate located on a concentric spigot projecting axially from one end of said guide means.

4. A valve in accordance with claim 1 wherein said annular stop member has an inner, annular portion forming said inner valve seat.

* * * * *